US012586472B2

(12) United States Patent
Cho

(10) Patent No.: US 12,586,472 B2
(45) Date of Patent: Mar. 24, 2026

(54) METHOD FOR PLATOONING IN INTERSECTION AND VEHICLE CONTROLLER THEREFOR

(71) Applicant: HYUNDAI MOBIS CO., LTD., Seoul (KR)

(72) Inventor: Chang Ho Cho, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 399 days.

(21) Appl. No.: 17/880,176

(22) Filed: Aug. 3, 2022

(65) Prior Publication Data

US 2023/0154336 A1 May 18, 2023

(30) Foreign Application Priority Data

Nov. 17, 2021 (KR) ........................ 10-2021-0158880

(51) Int. Cl.
| | |
|---|---|
| *G08G 1/00* | (2006.01) |
| *B60W 30/165* | (2020.01) |
| *B60W 30/18* | (2012.01) |

(52) U.S. Cl.
CPC ............. *G08G 1/22* (2013.01); *B60W 30/165* (2013.01); *B60W 30/18159* (2020.02); *B60W 2552/05* (2020.02); *B60W 2554/402* (2020.02); *B60W 2554/4041* (2020.02); *B60W 2556/65* (2020.02)

(58) Field of Classification Search
CPC .................. G08G 1/22; B60W 30/165; B60W 30/18159; B60W 2552/05; B60W 2554/402; B60W 2554/4041; B60W 2556/65; B60W 30/18154; B60W 60/001; B60W 2050/0002; B60W 2300/00

USPC ........................................................ 701/24
See application file for complete search history.

(56) References Cited

U.S. PATENT DOCUMENTS

| | | | | |
|---|---|---|---|---|
| 11,080,753 | B2 * | 8/2021 | Cho ........................ | G09F 21/04 |
| 11,788,853 | B2 * | 10/2023 | Kim ........................ | G08G 1/22 |
| | | | | 701/410 |
| 11,935,417 | B2 * | 3/2024 | Guney ................... | G05D 1/247 |
| 2017/0270785 | A1 * | 9/2017 | Umehara ................ | G08G 1/08 |
| 2019/0258268 | A1 * | 8/2019 | Macneille ........... | G05D 1/0287 |
| 2019/0266644 | A1 | 8/2019 | Cho et al. | |
| 2020/0027355 | A1 * | 1/2020 | Sujan ..................... | H04W 4/46 |

(Continued)

FOREIGN PATENT DOCUMENTS

WO WO 2017/035516 A1 3/2017

OTHER PUBLICATIONS

Extended European search report issued on Apr. 12, 2023, in counterpart European Patent Application No. 22191282.7 (9 pages in English).

(Continued)

*Primary Examiner* — Kito R Robinson
*Assistant Examiner* — Rose Ridder
(74) *Attorney, Agent, or Firm* — NSIP Law

(57) ABSTRACT

A method for platooning vehicles to pass by an intersection, includes obtaining, by a first vehicle controlling driving of a forward platoon, signal information of the intersection; determining, by the first vehicle, vehicle ranks of the forward platoon to pass by the intersection together based on the signal information; and determining, by the first vehicle, a second vehicle to control another driving of a following platoon to be separated from the forward platoon, in response to determining that the vehicle ranks do not pass by the intersection together.

13 Claims, 3 Drawing Sheets

(56)     References Cited

U.S. PATENT DOCUMENTS

| | | | |
|---|---|---|---|
| 2020/0080853 | A1 | 3/2020 | Tam et al. |
| 2020/0135033 | A1* | 4/2020 | Switkes .................... G08G 1/22 |
| 2020/0184827 | A1* | 6/2020 | Park ...................... G08G 1/0116 |
| 2021/0304619 | A1 | 9/2021 | Nilsson et al. |
| 2022/0415179 | A1* | 12/2022 | Kumar ............. G08G 1/096791 |
| 2022/0415181 | A1* | 12/2022 | Wang ............... G08G 1/096775 |
| 2024/0321110 | A1* | 9/2024 | O'Donnell ............... G08G 1/22 |

OTHER PUBLICATIONS

Extended Wuropean Search Report issued Dec. 5, 2024 in counterpart European Patent Application No. 22191282.7 (9 pages in English).

\* cited by examiner

METHOD FOR PLATOONING IN INTERSECTION AND VEHICLE CONTROLLER THEREFOR

CROSS-REFERENCE TO RELATED APPLICATIONS

The application claims the benefit under 35 USC 119(a) of Korean Patent Application Number 10-2021-0158880, filed Nov. 17, 2021 in the Korean Intellectual Property Office, the entire contents of which is incorporated herein by reference for all purposes.

TECHNICAL FIELD

The following description relates to a method for platooning in an intersection and a vehicle controller therefor.

BACKGROUND

The information disclosed below in this section is to aid in the understanding of the background of the present disclosure, and should not be taken as acknowledgement that this information forms any part of prior art.

Platooning is a technique for driving a plurality of vehicles together in a group. Platooning vehicles are classified into a leader vehicle that leads the platoon at the front of the platoon and a follower vehicle that joins the platoon of the leader vehicle. The follower vehicles can keep follow the leader vehicle on the basis of the driving information (e.g., GPS coordinates, speed, route, direction, etc.) of the leader vehicle. Accordingly, the drivers of the follower vehicles can freely do actions (e.g., operating a smartphone, sleeping, etc.) in the vehicles.

Meanwhile, when vehicles are positioned in a dilemma zone, the vehicles are individually driven in accordance with determination of the drivers or an autonomous driving system. A dilemma zone means a section in which a vehicle approaching an intersection cannot stopped at a stop line due to the driving speed even if a yellow light is on or the vehicle cannot completely come out of the crossing area of the intersection until the yellow light is turned off. When vehicles that are platooning are positioned in a dilemma zone, the driving pattern of the vehicle that are platooning should be changed in accordance with which vehicles are in the dilemma zone and several traffic situations.

A platooning plan according to the state of a driving road and traffic states has been contrived in the related art, but this is a common platooning plan and there is a need for contriving a platooning plan in a specific situation called a dilemma zone.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method for platooning vehicles to pass by an intersection, includes obtaining, by a first vehicle controlling driving of a forward platoon, signal information of the intersection; determining, by the first vehicle, vehicle ranks of the forward platoon to pass by the intersection together based on the signal information; and determining, by the first vehicle, a second vehicle to control another driving of a following platoon to be separated from the forward platoon, in response to determining that the vehicle ranks do not pass by the intersection together.

The method may further include obtaining, by the first vehicle, vehicle type information and vehicle position information of all or some of remaining vehicles of the forward platoon. The determining of the vehicle ranks to pass by the intersection together may be performed in further consideration of the vehicle type information and the vehicle position information.

The method may further include instructing, by the first vehicle, the second vehicle to stand by at the intersection.

The method may further include transmitting, by the first vehicle, driving information of the forward platoon to the second vehicle.

The method may further include expecting, by the second vehicle, a rendezvous point of the following platoon and the forward platoon based on the driving information of the forward platoon.

When the rendezvous point is included in a destination of the following platoon, the first vehicle may lose control right for the following platoon.

When a route more time and cost efficient than a driving route of the forward platoon exists in available driving routes of the following platoon, the first vehicle may lose control right for the following platoon.

In another general aspect, a method for platooning vehicles to pass by an intersection, includes receiving, by a second vehicle in a forward platoon, from a first vehicle controlling driving of the forward platoon, an instruction to control a following platoon to be separated from the forward platoon.

The method may further include receiving, by the second vehicle, from the first vehicle, an instruction to stand by at the intersection; and instructing, by the second vehicle, another vehicle of the following platoon to stand by.

The method may further include expecting, by the second vehicle, a rendezvous point of the following platoon and the forward platoon based on driving information of the forward platoon.

The method may further include determining, by the second vehicle, a driving route of the following platoon when a predetermined condition is satisfied.

The predetermined condition may include an expected rendezvous point of the forward platoon and the following platoon being included in a destination of the following platoon, or existence of a time and cost efficient driving route in comparison to a driving route of the forward platoon.

A non-transitory computer-readable storage medium may store instructions that, when executed by a processor, configure the processor to perform any of the methods herein.

In another general aspect, a vehicle controller for controlling platooning at an intersection, includes a sensor configured to obtain signal information of the intersection; and a rank manager configured to determine vehicle ranks of a platoon to pass by the intersection together based on the signal information, and determine a second vehicle to control driving of a following rank split off from the platoon, in response to determining that the vehicle ranks do not pass by the intersection together.

Other features and aspects will be apparent from the following detailed description, the drawings, and the claims.

BRIEF DESCRIPTION OF THE DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

Figure 1:
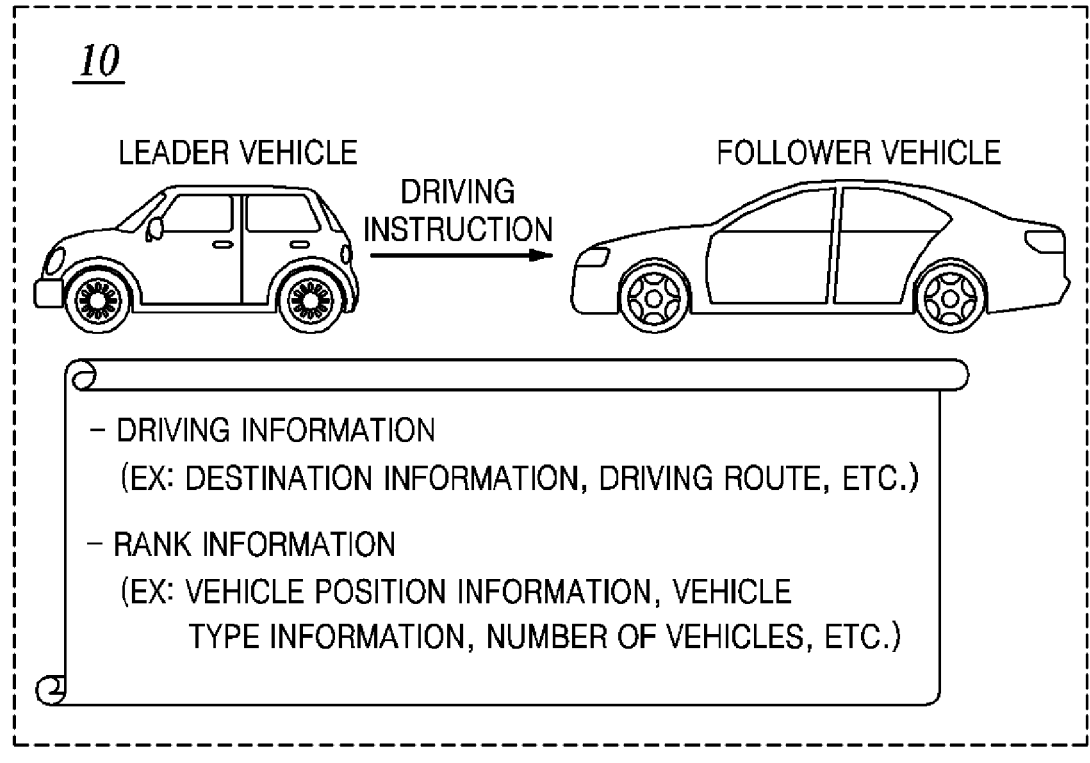
FIG. 1 is a conceptual diagram showing a platoon according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above"

or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

According to an aspect of the present disclosure, it is possible to provide a platooning method when passing through an intersection during platooning.

According to an aspect of the present disclosure, it is possible to provide a method that can appropriately control platooning for the following rank on the basis of the driving information of the forward rank of the platoon.

FIG. 1 is a conceptual diagram showing a platoon according to an embodiment of the present disclosure.

A platoon 10 according to an embodiment of the present disclosure includes a leader vehicle and follower vehicles. The leader vehicle, which is a vehicle controlling driving of the platoon 10, may be configured to give instructions about driving (e.g., a stopping instruction, a standby instruction, a parking instruction, a driving instruction, a passing-by instruction, and a driving route instruction) to the follower vehicles. The leader vehicle may be configured to give these instructions about driving by collecting, storing, and using driving information and rank information.

Here, the driving information is information about driving of the platoon 10 and may include destination information, driving route information, etc. of the platoon 10. The follower vehicles may be configured to receive the driving state or the driving trajectory of the leader vehicle, and the driving state, the driving trajectory, and the driving pattern of the leader vehicle may also be included in the driving information. This driving state may include a lane change timing, an entry steering angle, an entry speed, etc. according to the shape and situation of a road.

The rank information is information about ranks and may include the vehicle information (e.g., position information, vehicle type information, a speed, various sensor values, etc.) of the vehicles forming ranks, the number of the vehicles, etc. This rank information may further include, when the rank is divided, information about the forward rank and following rank, the information about rear vehicles in the forward rank, the information about front vehicles in the following rank, etc. When the rank is divided, the leader vehicle may be configured to perform driving control on the follower vehicles of the following rank by continuously receiving the information about the separated following rank from the vehicles of the following rank.

The vehicles in the platoon 10 may be equipped with a Vehicle to Everything (V2X) communication module, so the vehicles can communicate with external objects. For example, Vehicle to Vehicle (V2V) communication may be performed between the leader vehicle and the follower vehicles, Vehicle to Infra (V2I) communication may be performed between the leader vehicle and an infrastructure, and Vehicle to Personnel (V2P) communication may be performed with pedestrians.

The vehicles of the platoon 10 may be autonomous vehicles. The vehicles may include a front camera, a rear camera, an ultrasonic sensor, etc. to monitor the front, rear, and surround. The vehicles may be configured to analyze the situation of a driving road and traffic congestion on the basis of the shape, width, number of lanes, and curvature of the road using a high-definition map information. The vehicles may be configured to perform autonomous driving by performing engine control, braking control, steering control, etc. on the basis of sensor data and the analyzed result.

Meanwhile, the follower vehicles can be driven to follow the leader vehicle by receiving the driving state, the driving pattern, the driving trajectory, etc. of the leader vehicle. When a follower vehicle splits off from the platoon 10, the follower vehicle can be driven to follow the platoon again. The follower vehicles can be driven to reduce split from the platoon 10 or join the platoon again when splitting off while following the leader vehicle in consideration of a driving situation or a driving environment. This driving may be performed in an autonomous driving method in accordance with an autonomous driving mode of a vehicle, or may be performed in the way of assisting a driver to drive, or may be performed in accordance with a manual or in a way of remote control, etc.

A vehicle controller for performing platooning according to an embodiment of the present disclosure may include a sensing unit (sensor) configured to obtain signal information of intersections, and a rank management unit (rank manager) configured to determine whether the vehicle ranks of the platoon pass by an intersection together on the basis of signal information, and to determine a vehicle for controlling driving of the following rank, which is a platoon to split off from the platoon, when determining that the vehicle ranks do not pass by the intersection together. Further, the vehicle controller may further include an authority management unit for keeping or transferring a control right of the vehicle ranks, an authentication unit for performing an authentication process on a vehicle, to which the control right is transferred, or another vehicle in the platoon. The vehicle controller may further include a collection unit configured to collect, store, and manage driving information and rank information, and an instruction transmission unit configured to transmit instructions about driving to other vehicles in the platoon on the basis of the driving information and/or the rank information.

Meanwhile, the leader vehicle in platooning is not fixed and may be changed in accordance with the right relationship. The follower vehicles may also be leader vehicles by receiving the control right from the leader vehicle or in other methods. Accordingly, a vehicle that can perform platooning may be a leader vehicle or a follower vehicle, and may include a controller for performing platooning according to each type.

Figure 2:
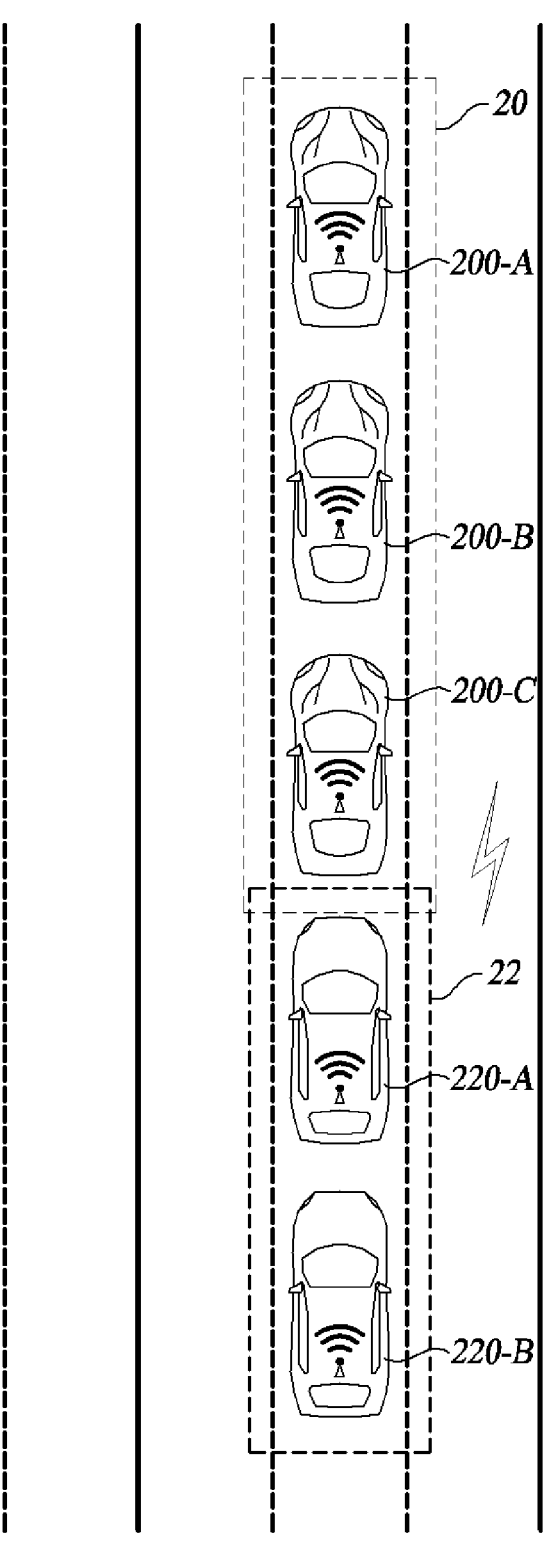
FIG. 2 is a conceptual diagram illustrating a platooning method according to an embodiment of the present disclosure.

FIG. 2 is a conceptual diagram illustrating a platooning method according to an embodiment of the present disclosure.

FIG. 2 is a flowchart showing a platooning method at an intersection according to an embodiment of the present disclosure. A first vehicle 200-A that is the leader vehicle of platoons 20 and 22 may control driving of the other vehicles 200-B to 220-B that are follower vehicles. The first vehicle 200-A obtains signal information of an intersection when approaching the intersection while controlling driving. The first vehicle 200-A determines whether the vehicle ranks of the platoons 20 and 22 pass by the intersection together. In this case, the meaning of 'together' means all of the vehicles 200-A to 220-B included in the platoons 20 and 22. The first vehicle determines whether all of the vehicles can pass together and can determine whether to pass together in consideration of the time to the destination, the traffic environment, the surrounding environment, etc. The first vehicle 200-A calculates the range of the rank that can pass by the intersection together and divides the existing platoon into a forward rank 20 and a following rank 22, and can determine a second vehicle 220-A, which is a vehicle at the front of the following rank 22, as a leader vehicle of the following rank 22.

When the forward rank 20 and the following rank 22 are separated, the first vehicle 200-A gives an instruction to pass by the intersection to the other vehicles 200-B and 200-*c* of the forward rank 20. Meanwhile, the control relationship of the first vehicle 200-A and the second vehicle 220-A may be different in accordance with embodiments. The first vehicle 200-A can give the second vehicle 220-A the right to control the following rank 22 and can instruct the second vehicle 220-A to gives an instruction to stand by to the other vehicle 220-B of the following rank 22. Alternatively, the first vehicle 200-A may set and gives a right to control the following rank 22 to the second vehicle 220-A while keeping its own right to control the following rank 22.

Figure 3:
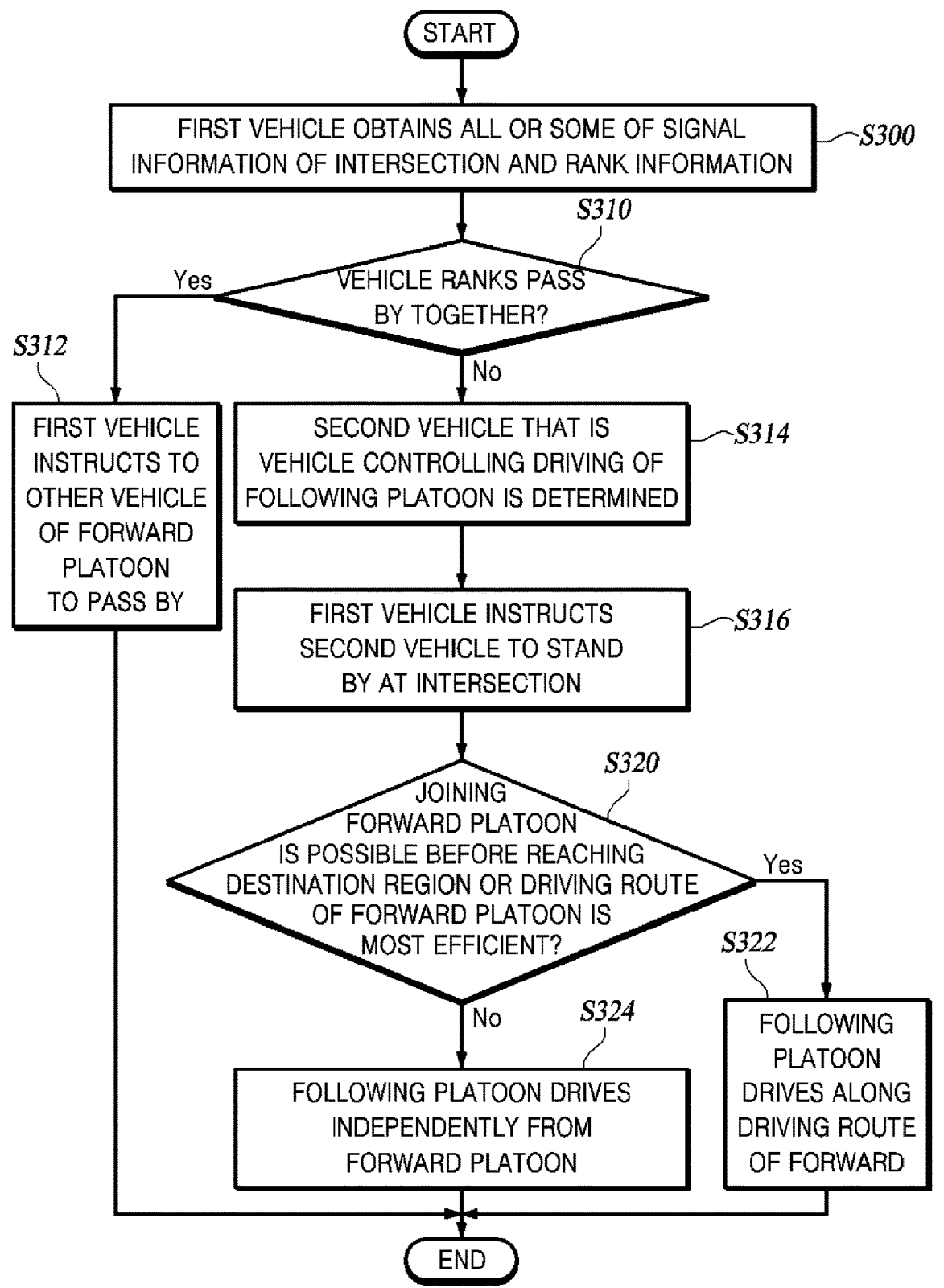
FIG. 3 is a flowchart showing the platooning method according to an embodiment of the present disclosure.

FIG. 3 is a flowchart showing the platooning method according to an embodiment of the present disclosure.

FIG. 3 shows a platooning method for a forward platoon including two or more vehicles passes by an intersection.

A first vehicle that is a vehicle controlling driving of a forward platoon obtains all or some of signal information of an intersection and rank information (S300). The rank information may include vehicle position information, vehicle type information, the number of vehicles, etc. The signal information of an intersection may be information that is obtained from a traffic signal system through V2I communication or is sensed from sensors (e.g., a front camera, etc.) of the first vehicle.

The first vehicle determines whether the vehicle ranks in the forward platoon pass by the intersection together on the basis of the information collected in step S300 (S310). This determination may be performed by estimating a vehicle range (e.g., the number of vehicles, etc.) of the forward platoon that can pass by the intersection. For example, the first vehicle can determine this by discriminating vehicles that can pass by the intersection or vehicles that cannot pass by the intersection within a remaining signal time (e.g., a remaining green signal time or a remaining yellow signal time) as the signal information on the basis of the types of vehicles, the positions of vehicles of each type, a driving speed of the rank, etc. as rank information.

Meanwhile, even if the first vehicle determines that the vehicle ranks of the forward platoon cannot pass by the intersection together, the first vehicle may determine to pass by the intersection together. Alternatively, even if the first vehicle determines that the vehicle ranks of the forward platoon can pass by the intersection together, the first vehicle may determine not to pass by the intersection together. For example, the first vehicle may determine not to pass by the intersection when obtaining emergency vehicle information from the surrounding environment, the traffic environment, various infrastructures, etc. and offering the driving order. When it is required to quickly pass by the intersection due to an accident, a natural disaster, collapse of a road, or the like, the first vehicle may determine to pass by the intersection together.

When determining to pass by the intersection together in step S10, the first vehicle instructs to the other vehicles of the forward platoon to pass by the intersection (S312). Accordingly, the forward platoon passes by the intersection and the procedure is ended.

When determining not to pass by the intersection together in step S310, the first vehicle determines a second vehicle that is a vehicle to control driving of the following platoon (S314). In this case, the following platoon means a following rank (or platoon) to be separated from the forward platoon. The following platoon separates from the forward ranks of the forward platoon and passes by the intersection. Meanwhile, the second vehicle may be determined on the basis of a vehicle of the forward platoon which was the reference for determining whether to pass by the intersection together in step S310. For example, the first vehicle may determine the vehicle right behind the rear vehicle of the forward rank as the second vehicle. The first vehicle may determine a vehicle that the most quickly responds to a broadcast signal transmitted to the vehicles of the following platoon as the second vehicle. Meanwhile, the following platoon may be a dependence relationship with the forward platoon in step S314. That is, the following platoon shares the destination and/or the driving route of the forward platoon.

The first vehicle instructs the second vehicle to stand by at the intersection (S316). In accordance with the dependence relationship of the forward platoon and the following platoon, the first vehicle can instruct all of the vehicles of the following platoon to stand by. Alternatively, the first vehicle may instruct only the second vehicle such that the second vehicle instructs the other vehicles of the following platoon to stand by. In this case, the second vehicle may instruct each vehicle to stand by at an appropriate timing for preventing an accident of each vehicle of the following platoon.

The second vehicle determines that the following platoon and the forward platoon can join before reaching the destination or determines whether the driving route of the forward platoon is the most efficient (S320). The second vehicle can expect a joint timing and/or a rendezvous point of the following platoon and the forward platoon on the basis of the driving information of the forward platoon. For example, the following platoon can join the forward platoon by driving along the driving route of the forward platoon at a speed higher than the forward platoon after passing by the intersection. The 'join' means a case in which the rear vehicle of the forward platoon and the front vehicle of the following platoon come close to each other within a predetermined distance. Meanwhile, the front vehicle of the following platoon is generally a second vehicle, but is not necessarily a second vehicle. The second vehicle can determine whether to be able to join the forward platoon before reaching the destination by expecting the timing and the position at which the rear vehicle of the forward platoon and the front vehicle of the following platoon come close to each other within a predetermined distance.

Further, the second vehicle can determine whether a route that is more efficient in terms of time and cost than the driving route of the forward platoon exists. The second vehicle can find out whether an efficient route exists and then determine the route on the basis of information received from an infrastructure, navigation information, information received from an external server, etc. Alternatively, it is possible to receive and determine a more efficient route from an infrastructure, a navigation, an external server, etc.

When it is determined that joining is impossible before reaching the destination or when it is determined that an efficient driving route more than the driving route of the forward platoon exists in step S320, the following platoon drives independently from the forward platoon (S324). In this case, the following platoon becomes a forward platoon that is independent from the forward platoon. The first vehicle loses the control right for the following platoon. For example, when a route that requires a short time or a less cost in comparison to the expected arrival time of the forward platoon in the driving routes available for the following platoon, the first vehicle may lose the control right for the following platoon. The second vehicle determines the driving route of the following platoon independently from the forward platoon. However, the destination of the following platoon may be still the same as the destination of the forward platoon and the second vehicle may control driving of the following platoon on the basis of the driving information and rank information of the forward platoon.

When it is determined that joining is possible before reaching the destination or when it is determined that an efficient driving route more than the driving route of the forward platoon does not exist in step S320, the following platoon drives along the driving route the forward platoon (S322). The following platoon may join the forward platoon or may drive along the driving route of the forward platoon after standing by at the intersection. When the following platoon joins the forward platoon, the second vehicle may lose the control right for the following platoon and the first vehicle may control the original forward platoon including the following platoon. When the following platoon does not join the forward platoon, the second vehicle may control driving of the following platoon by receiving driving information, etc. from the first vehicle.

It is shown in FIG. 3 that the processes are sequentially performed, but this only describes the spirit of an embodiment of the present disclosure. In other words, the present disclosure may be changed and modified in various ways by those skilled in the art including some embodiments of the present disclosure by changing the order shown in FIG. 3 of the present disclosure or performing one or more of the processes in parallel without departing from the fundamental characteristics of some embodiments of the present disclosure, so the present disclosure is not limited to the time-series sequence of FIG. 3.

The vehicle controller, sensor, and rank manager in FIGS. 1-3 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-3 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method for platooning vehicles to pass through an intersection, the method comprising:

controlling driving, by a first vehicle, a forward platoon of vehicles that are following the first vehicle;

obtaining, by the first vehicle, signal information of the intersection;

determining, by the first vehicle, which of the platooning vehicles from the forward platoon will pass through the intersection together with the first vehicle based on the signal information;

controlling, by the first vehicle, a second vehicle to control driving of a following platoon including vehicles which are separated from the forward platoon, in response to determining that all of the vehicles of the forward platoon will not pass through the intersection together, wherein the first vehicle permanently ceases to retain any supervisory or control authority over the following platoon based on a determination, by the second vehicle, that rendezvous with the forward platoon before reaching a destination is infeasible, under a condition that the following platoon initially follows a driving route of the forward platoon, and only after the infeasibility determination does the following platoon deviate to an independently determined route; and controlling, by the second vehicle, the following platoon based on an independently determined driving route from the forward platoon, in response to the first vehicle ceasing to retain right of control over the following platoon.

2. The method of claim 1, further comprising obtaining, by the first vehicle, vehicle type information and vehicle position information of all or some of remaining vehicles of the forward platoon, wherein the determining of the vehicle ranks to pass by the intersection together is performed in further consideration of the vehicle type information and the vehicle position information.

3. The method of claim 1, further comprising:

instructing, by the first vehicle, the second vehicle to stand by at the intersection.

4. The method of claim 1, further comprising:

transmitting, by the first vehicle, driving information of the forward platoon to the second vehicle.

5. The method of claim 4, further comprising:

expecting, by the second vehicle, a rendezvous point of the following platoon and the forward platoon based on the driving information of the forward platoon.

6. The method of claim 4, wherein when a route more time and cost efficient than a driving route of the forward platoon exists in available driving routes of the following platoon, the first vehicle loses control right for the following platoon.

7. A non-transitory computer-readable storage medium storing instructions that, when executed by a processor, configure the processor to perform the method of claim 1.

8. A method for platooning vehicles to pass through an intersection, the method comprising:

controlling driving, by a first vehicle, a forward platoon of vehicles that are following the first vehicle;

receiving, by a second vehicle in the forward platoon, from a first vehicle controlling driving of the forward platoon, an instruction to control a following platoon of vehicles based on which vehicles will be separated from the forward platoon when passing through the intersection;

determining, by the second vehicle, whether rendezvous with the forward platoon before reaching a destination is infeasible, under a condition that the following platoon follows a driving route of the forward platoon, wherein the first vehicle permanently ceases to retain any supervisory or control authority over the following platoon based on a determination that rendezvous with the forward platoon before reaching a destination is infeasible, under a condition that the following platoon initially follows a driving route of the forward platoon, and only after the infeasibility determination does the following platoon deviate to an independently determined route; and controlling, by the second vehicle, the following platoon based on an independently determined driving route from the forward platoon, in response to the first vehicle ceasing to retain right of control over the following platoon.

9. The method of claim 8, further comprising:

receiving, by the second vehicle, from the first vehicle, an instruction to stand by at the intersection; and instructing, by the second vehicle, another vehicle of the following platoon to stand by.

10. The method of claim 8, wherein the expecting includes:

expecting, by the second vehicle, a rendezvous point of the following platoon and the forward platoon based on driving information of the forward platoon.

11. The method of claim 8, further comprising:

determining, by the second vehicle, a driving route of the following platoon when a predetermined condition is satisfied.

12. The method of claim 11, wherein the predetermined condition comprises an expected rendezvous point of the forward platoon and the following platoon being included in a destination of the following platoon, or existence of a time and cost efficient driving route in comparison to a driving route of the forward platoon.

13. A non-transitory computer-readable storage medium storing instructions that, when executed by a processor, configure the processor to perform the method of claim 8.

* * * * *